United States Patent
Nie et al.

(10) Patent No.: US 12,254,667 B2
(45) Date of Patent: Mar. 18, 2025

(54) MULTIPLE SCENARIO-ORIENTED ITEM RETRIEVAL METHOD AND SYSTEM

(71) Applicant: Shandong Jianzhu University, Jinan (CN)

(72) Inventors: Xiushan Nie, Jinan (CN); Yang Shi, Jinan (CN); Jie Guo, Jinan (CN); Xingbo Liu, Jinan (CN); Yilong Yin, Jinan (CN)

(73) Assignee: Shandong Jianzhu University (CN)

( * ) Notice: Subject to any disclaimer, the term of this patent is extended or adjusted under 35 U.S.C. 154(b) by 358 days.

(21) Appl. No.: 17/881,732

(22) Filed: Aug. 5, 2022

(65) Prior Publication Data
US 2023/0138302 A1    May 4, 2023

(30) Foreign Application Priority Data
Nov. 2, 2021 (CN) .......................... 202111286401.4

(51) Int. Cl.
*G06V 10/70* (2022.01)
*G06V 10/40* (2022.01)

(52) U.S. Cl.
CPC .............. *G06V 10/70* (2022.01); *G06V 10/40* (2022.01)

(58) Field of Classification Search
CPC .............. G06N 3/08; G06K 19/06037; G06V 10/7753; G06V 10/778; G06V 10/7715; G06V 10/82; G06V 10/761; G06V 10/70; G06V 10/454; G06V 10/40

USPC .......................................................... 382/159
See application file for complete search history.

(56) References Cited

FOREIGN PATENT DOCUMENTS

| CN | 107346327 A | * | 11/2017 | ......... G06F 16/5866 |
|---|---|---|---|---|
| CN | 110795590 A | * | 2/2020 | ............ G06F 16/55 |
| CN | 111274424 A | * | 6/2020 | |
| CN | 111461157 B | * | 11/2022 | ........... G06K 9/6267 |

\* cited by examiner

*Primary Examiner* — Chineyere Wills-Burns
*Assistant Examiner* — Emmanuel Silva-Avina
(74) *Attorney, Agent, or Firm* — Price Heneveld LLP

(57) ABSTRACT

A multiple scenario-oriented item retrieval method and system. The method includes the steps of extracting, by Hashing learning, image features from an image training set to train a pre-built item retrieval model; when an image is in a scenario of hard samples, introducing an adaptive similarity matrix, optimizing the similarity matrix by an image transfer matrix, constructing an adaptive similarity matrix objective function in combination with an image category label; constructing a loss quantization objective function between the image and a Hash code according to the image transfer matrix; when the image is in a scenario of zero samples, introducing an asymmetric similarity matrix, constructing an objective function by taking the image category label as supervisory information in combination with equilibrium and decorrelation constraints of the Hash code; and training the item retrieval model based on the above objective function to obtain a retrieved result of a target item image.

10 Claims, 5 Drawing Sheets

| Method | CIFAR-10 | | | | NUS-WIDE | | | | MS-COCO | | | |
|---|---|---|---|---|---|---|---|---|---|---|---|---|
| | 24 | 48 | 64 | 128 | 24 | 48 | 64 | 128 | 24 | 48 | 64 | 128 |
| LSH | 0.1143 | 0.117 | 0.1173 | 0.1189 | 0.4005 | 0.4013 | 0.4014 | 0.4016 | 0.4243 | 0.4237 | 0.4241 | 0.4232 |
| SH | 0.1527 | 0.1571 | 0.155 | 0.159 | 0.5536 | 0.5680 | 0.5743 | 0.5833 | 0.4491 | 0.447 | 0.4494 | 0.4492 |
| ITQ | 0.1808 | 0.1634 | 0.1709 | 0.1879 | 0.5613 | 0.5746 | 0.5785 | 0.5893 | 0.4567 | 0.4674 | 0.4748 | 0.4844 |
| SDH | 0.1802 | 0.211 | 0.2364 | 0.3299 | 0.6139 | 0.6168 | 0.6107 | 0.6355 | 0.446 | 0.4715 | 0.4703 | 0.4888 |
| FSSH | 0.2345 | 0.3139 | 0.3083 | 0.3348 | 0.5998 | 0.6186 | 0.5955 | 0.5602 | 0.4574 | 0.4759 | 0.486 | 0.4826 |
| RSSDH | 0.3018 | 0.3231 | 0.3397 | 0.3604 | 0.6078 | 0.6364 | 0.6374 | 0.6383 | 0.4774 | 0.4564 | 0.4561 | 0.4937 |
| SDHMLR | 0.3427 | 0.3432 | 0.3296 | 0.3286 | 0.6078 | 0.6245 | 0.6367 | 0.6319 | 0.47 | 0.4805 | 0.4775 | 0.4911 |
| SSLH | 0.3342 | 0.3449 | 0.3361 | 0.3421 | 0.5883 | 0.6177 | 0.6198 | 0.6361 | 0.445 | 0.4741 | 0.4797 | 0.5015 |
| SCDH | 0.3373 | 0.3172 | 0.3898 | 0.3886 | 0.6177 | 0.6254 | 0.6287 | 0.6434 | 0.5085 | 0.4886 | 0.5015 | 0.4934 |
| SASH | 0.3761 | 0.3932 | 0.3949 | 0.4006 | 0.623 | 0.6481 | 0.6442 | 0.6575 | 0.6185 | 0.6279 | 0.6347 | 0.6404 |

FIG. 2

| Method | AWA2 | | | CUB | | | Cifar-10 | | |
|---|---|---|---|---|---|---|---|---|---|
| | 24 | 48 | 64 | 128 | 24 | 48 | 64 | 128 | 24 | 48 | 64 | 128 |
| LSH | 0.0106 | 0.0151 | 0.0204 | 0.0306 | 0.0055 | 0.0869 | 0.0776 | 0.0895 | 0.0889 | 0.0151 | 0.0202 | 0.0208 |
| SH | 0.1833 | 0.2729 | 0.2955 | 0.3441 | 0.0568 | 0.081 | 0.0886 | 0.1191 | 0.0726 | 0.085 | 0.0856 | 0.0881 |
| ITQ | 0.1999 | 0.2821 | 0.2964 | 0.3764 | 0.0533 | 0.0765 | 0.0892 | 0.1182 | 0.0929 | 0.0878 | 0.0936 | 0.1057 |
| SDH | 0.146 | 0.2481 | 0.2975 | 0.3326 | 0.0495 | 0.0874 | 0.1069 | 0.1028 | 0.0796 | 0.0872 | 0.0913 | 0.1007 |
| FSSH | 0.0054 | 0.1749 | 0.2074 | 0.2937 | 0.0055 | 0.0131 | 0.0166 | 0.0749 | 0.0899 | 0.0849 | 0.1153 | 0.1275 |
| SCDH | 0.1603 | 0.2423 | 0.3183 | 0.288 | 0.0092 | 0.0263 | 0.041 | 0.0709 | 0.0654 | 0.0853 | 0.0928 | 0.0874 |
| ZSH/TSK | 0.2262 | 0.3109 | 0.3873 | 0.4151 | 0.0739 | 0.12 | 0.1304 | 0.1112 | 0.0039 | 0.1093 | 0.1144 | 0.1279 |
| AH | 0.2275 | 0.1989 | 0.3154 | 0.3557 | 0.048 | 0.0897 | 0.1089 | 0.1445 | 0.0899 | 0.1049 | 0.1108 | 0.1353 |
| OPZH | 0.1056 | 0.139 | 0.1642 | 0.1961 | 0.0632 | 0.0879 | 0.0982 | 0.1143 | 0.0911 | 0.1063 | 0.1072 | 0.1226 |
| SASH | 0.256 | 0.3421 | 0.3896 | 0.3974 | 0.0744 | 0.1278 | 0.1426 | 0.1535 | 0.094 | 0.1415 | 0.1387 | 0.1496 |

FIG. 3

| Method | AWA2 | | | | CUB | | | | CIFAR10 | | | |
|---|---|---|---|---|---|---|---|---|---|---|---|---|
| | 24 bits | 48 bits | 64 bits | 128 bits | 24 bits | 48 bits | 64 bits | 128 bits | 24 bits | 48 bits | 64 bits | 128 bits |
| LSH | 0.0106 | 0.0151 | 0.0204 | 0.0306 | 0.0055 | 0.0069 | 0.0076 | 0.0095 | 0.0089 | 0.0151 | 0.0202 | 0.0208 |
| SH | 0.1833 | 0.2729 | 0.2955 | 0.3441 | 0.0568 | 0.081 | 0.0886 | 0.1191 | 0.0726 | 0.085 | 0.0856 | 0.0881 |
| ITQ | 0.1999 | 0.2821 | 0.2964 | 0.3764 | 0.0533 | 0.0765 | 0.0892 | 0.1182 | 0.0929 | 0.0878 | 0.0936 | 0.1057 |
| SDH | 0.146 | 0.2481 | 0.2975 | 0.3326 | 0.0495 | 0.0874 | 0.1069 | 0.1028 | 0.0796 | 0.0872 | 0.0913 | 0.1007 |
| FSSH | 0.0854 | 0.1749 | 0.2074 | 0.2937 | 0.0055 | 0.0131 | 0.0166 | 0.0749 | 0.0899 | 0.0849 | 0.1153 | 0.1275 |
| SCDH | 0.1603 | 0.2423 | 0.3183 | 0.288 | 0.0092 | 0.0263 | 0.041 | 0.0709 | 0.0654 | 0.0853 | 0.0926 | 0.0874 |
| TSK | 0.2262 | 0.3109 | 0.3873 | 0.4151 | 0.0739 | 0.12 | 0.1394 | 0.1112 | 0.0939 | 0.1093 | 0.1144 | 0.1279 |
| AH | 0.2275 | 0.1969 | 0.3154 | 0.3557 | 0.048 | 0.0897 | 0.1089 | 0.1445 | 0.0899 | 0.1049 | 0.1108 | 0.1353 |
| OPZH | 0.1056 | 0.139 | 0.1618 | 0.1961 | 0.0632 | 0.0679 | 0.0962 | 0.1143 | 0.0911 | 0.1063 | 0.1072 | 0.1276 |
| ASZH | 0.2619 | 0.3787 | 0.4032 | 0.4158 | 0.0764 | 0.1192 | 0.1294 | 0.1727 | 0.1103 | 0.1471 | 0.1568 | 0.1637 |
| DPSH | 0.041 | 0.0423 | 0.0493 | 0.0547 | 0.0071 | 0.0088 | 0.0089 | 0.0107 | 0.1176 | 0.1107 | 0.1146 | 0.123 |
| DPSH | 0.0696 | 0.0802 | 0.0891 | 0.1028 | 0.0081 | 0.0081 | 0.0091 | 0.0062 | 0.1654 | 0.1654 | 0.1694 | 0.1641 |
| DSDH | 0.0674 | 0.0804 | 0.0909 | 0.0994 | 0.0111 | 0.0154 | 0.0173 | 0.0189 | 0.1409 | 0.1379 | 0.1376 | 0.1393 |
| DCH | 0.068 | 0.0619 | 0.0626 | 0.0576 | 0.0264 | 0.0322 | 0.0365 | 0.0321 | 0.1814 | 0.1504 | 0.175 | 0.1709 |
| DDSH | 0.0674 | 0.0804 | 0.0909 | 0.0994 | 0.0055 | 0.0043 | 0.0064 | 0.004 | 0.1337 | 0.1452 | 0.1513 | 0.1499 |
| ADSH | 0.1728 | 0.2231 | 0.2331 | 0.224 | 0.0804 | 0.0805 | 0.0853 | 0.1019 | 0.1838 | 0.1897 | 0.1854 | 0.1862 |
| SitNet | 0.2344 | 0.2406 | 0.2549 | 0.265 | 0.088 | 0.1127 | 0.1141 | 0.1167 | 0.2047 | 0.207 | 0.2053 | 0.2207 |
| ASZH | 0.2619 | 0.3787 | 0.4032 | 0.4158 | 0.0764 | 0.1192 | 0.1294 | 0.1727 | 0.1103 | 0.1471 | 0.1568 | 0.1637 |

FIG. 4

| method | without | std | ave | minmax |
|---|---|---|---|---|
| SDH | 0.2975 | 0.2975 | 0.3154 | 0.2975 |
| FSSH | 0.2074 | 0.1416 | 0.3382 | 0.2397 |
| SCDH | 0.3183 | 0.3501 | 0.3456 | 0.3398 |
| TSK | 0.3873 | 0.3748 | 0.3842 | 0.3554 |
| AH | 0.3154 | 0.3154 | 0.3154 | 0.3154 |
| OPZH | 0.1618 | 0.1724 | 0.1675 | 0.1633 |
| ASZH | 0.3431 | 0.3964 | 0.359 | 0.4032 |

FIG.5

MULTIPLE SCENARIO-ORIENTED ITEM RETRIEVAL METHOD AND SYSTEM

CROSS REFERENCE TO RELATED APPLICATION

This patent application claims the benefit and priority of Chinese Patent Application No. 202111286401.4, filed on Nov. 2, 2021, the disclosure of which is incorporated by reference herein in its entirety as part of the present application.

TECHNICAL FIELD

The present disclosure relates to the technical field of image processing, in particular to a multiple scenario-oriented item retrieval method and system.

BACKGROUND ART

Item retrieval is an important research topic in the field of computer vision, which is intended to process, analyze and understand images captured by the camera using a computer or a robot, so as to identify targets and items in different modes.

Multiple scenarios include scenarios of easily-confused samples, scenarios of multi-label samples, and scenarios of zero samples. For example, in a scenario of multi-label samples, an image has multiple category labels, at this time, the criterion for judging whether the image and another image are of the same category is that the two images have at least one identical category. In a scenario of zero samples, the categories in a test set and those in a training set are mutually exclusive, for example, there are four categories in the training set, such as dogs, mice, horses and sheep, while other categories such as cats and snakes in the test set. In this case, it is necessary to train a model to learn general classification knowledge, so that the model can judge an item does not fall within some known categories even if it has never seen the item before. Such scenarios where the model finds it difficult to learn samples are called scenarios of hard samples.

Nowadays, it is already feasible to collect images in a real-environment using a robot, and obtain a classifier via training. For simple images, it is easy to acquire an appropriate feature representation to distinguish them from samples with different semantics, while in a scenario of hard samples, such as a scenario of easily-confused samples, or a scenario of multi-label samples, obtaining an appropriate feature representation often requires more attention, given the hard-to-learn images contained. In a scenario of hard samples, the similarity relationship between images is hard to acquire. Moreover, the performance of the model is highly dependent on the similarity relationship among images, while existing item retrieval methods use predefined similarity relationship, without accurately reflecting the real similarity relationship between images, resulting in poor retrieval performance.

In addition, for a scenario of zero samples, since it is impossible to acquire all kinds of images in the world as training sets, there are inevitably items of categories that do not exist in the training set in practical application. In this situation, it is required to find semantic embedding space to transfer the knowledge learned in the training process from the visible category to the invisible category. However, popular item retrieval methods may excessively learn the knowledge of the visible category, which leads to relatively poor generalization performance of the item retrieval method in the scenario of zero samples.

To sum up, item retrieval methods have at least the following technical problems.

First, most of the existing item retrieval methods are based on learning of a data similarity matrix which is predefined by supervised labels or distance measurement types. This predefined similarity matrix, however, fails to accurately reflect the real similarity relationship between images. In a scenario of hard samples, such as a scenario of easily-confused samples, or a scenario of multi-label samples, items under retrieval cover a large number of easily-confused entities, which generally have similar feature representations. Therefore, it is necessary to mine the true similarity relationship between images more accurately to guide the generation of image features. Existing item retrieval methods have considered neither the scenario of hard samples nor the similarity relationship of images.

Second, in the scenario of zero samples, existing item retrieval methods, when adopted to train a model, may introduce special labels, such as special monitoring information like semantic vectors or attribute labels; semantic vectors refer to the vectors converted from the image category names through natural language processing (NLP), and such supervisory information is not directly available; attribute labels are configured to indicate whether there are some predefined parts in an image, such as whether there are wings, or whether it is black. This kind of label information usually exists only in data sets of zero samples, and is difficult to obtain in a real environment.

Third, since a traditional similarity matrix can learn the relationship between visible data, when item search is conducted in the scenario of zero samples using the traditional similarity matrix, overfitting may occur on the relationship between the visible data, making it impossible to integrate invisible data knowledge. Therefore, the symmetric similarity matrix for item search in a traditional scenario is not suitable for item retrieval in a scenario of zero samples.

SUMMARY

To resolve the foregoing problem, the present disclosure provides a multiple scenario-oriented item retrieval method and system, thereby achieving item retrieval in multiple scenarios such as a scenario of hard samples, and a scenario of zero samples. In a scenario of hard samples, an adaptive similarity matrix is introduced to distinguish the easily-confused entities and obtain an accurate image similarity relationship; and in a scenario of zero samples, the asymmetric similarity matrix is introduced, and instead of special supervisory information, only the easily-accessible category label information is adopted.

To achieve the above objective, the present disclosure adopts the following technical solutions.

In a first aspect, the present disclosure provides a multiple scenario-oriented item retrieval method, including:
extracting, by Hashing learning, image features from an obtained image training set, and training a pre-built item retrieval model;
when an image is in a scenario of hard samples, introducing an adaptively optimized similarity matrix into Hashing learning, optimizing the similarity matrix by an image transfer matrix, and constructing an adaptive similarity matrix objective function with the optimized similarity matrix and an image category label; constructing a quantization loss objective function between the image and a Hash code according to the image transfer matrix; and conducting nonlinear Hashing mapping on the adaptive similarity matrix objective function and the quantization loss objective function to obtain a model objective function;

when the image is in a scenario of zero samples, introducing into Hashing learning an asymmetric similarity matrix configured to constrain the generation of Hash codes, constructing an objective function by taking an image category label as supervisory information in combination with equilibrium and decorrelation constraints of a Hash code, and conducting nonlinear Hashing mapping on the objective function to obtain a model objective function; and training the item retrieval model based on the model objective function, and obtaining a retrieved result of a to-be-retrieved target item image based on the trained item retrieval model.

As an alternative implementation, the adaptive similarity matrix objective function is as follows:

$$\min_{W,S} \sum_{i,j} (\|W^T x_i - W^T x_j\|_2^2 s_{ij} + \alpha s_{ij}^2) + \beta \sum_{i,j} \|y_i - y_j\|_2^2 s_{ij}$$

$$\text{s.t. } \forall i, s_i^T 1_n = 1, 0 \leq s_{ij} \leq 1$$

where $1_n$ denotes an all-ones vector of n×1, and n denotes a sample size; $s_{ij}$ denotes an element of a similarity matrix S, with a value being a similarity weight of image $x_i$ and image $x_j$, and $s_i$ denotes an ith row vector of the matrix S; W denotes a transfer matrix; $y_i$ and $y_j$ denote category labels; and $\alpha$ and $\beta$ denote positive parameters.

As an alternative implementation, the quantization loss objective function is as follows:

$$\min_{W,B} \lambda \|W^T X - B\|_F^2 + \gamma \|P\|_F^2$$

$$\text{s.t. } B \in \{-1, +1\}^{k \times n}$$

where W denotes a transfer matrix between an image and a Hash code, P denotes a transfer matrix between an image and nonlinear Hashing, X denotes an image training set, B denotes a Hash code, $\lambda$ and $\gamma$ denote positive parameters, k denotes a length of a Hash code, n denotes a sample size, and $\|\cdot\|_F$ denotes an f norm.

As an alternative implementation, said nonlinear Hashing mapping includes expanding the objective function into nonlinear Hashing through a kernel function, which is expressed as:

$$\varphi(X) = [\varphi(x_1), \varphi(x_2), \ldots, \varphi(x_n)]^T,$$

where $\varphi: x \in R^d \to \varphi(x) \in R^{d'}$ denotes nonlinear mapping, d denotes a feature dimension of image $x_n$, d' denotes a dimension after mapping, X denotes an image training set, and n denotes a sample size.

As an alternative implementation, the model objective function in the scenario of hard samples is as follows:

$$\min_{P,S,B} \sum_{i,j} (\|P^T \varphi(x_i) - P^T \varphi(x_j)\|_2^2 s_{ij} + \alpha s_{ij}^2) +$$

$$\beta \sum_{i,j} \|y_i - y_j\|_2^2 s_{ij} + \lambda \|P^T \varphi(X) - B\|_F^2 + \gamma \|P\|_F^2$$

$$\text{s.t. } \forall i, s_i^T 1_n = 1, 0 \leq s_{ij} \leq 1, B \in \{-1, +1\}^{k \times n};$$

where n denotes a sample size, W denotes a transfer matrix between an image and a Hash code, and P denotes a transfer matrix between an image and nonlinear Hashing; X denotes an image training set, B denotes a Hash code, $1_n$ denotes an all-ones vector of n×1, $s_{ij}$ denotes an element of a similarity matrix S, with a value being a similarity weight of image $x_i$ and image $x_j$, and $s_i$ denotes an ith row vector of the matrix S; $\varphi(\ )$ denotes nonlinear mapping; $y_i$ and $y_j$ denote category labels; and $\alpha$, $\beta$, $\lambda$ and $\gamma$ denote positive parameters, and k denotes a length of a Hash code.

As an alternative implementation, the model objective function in the scenario of zero samples is as follows:

$$\min_{B,P,W,Z} \|k \cdot S - BZ^T\|_F^2 + \lambda \|\varphi(X) P - B\|_F^2 +$$

$$\alpha \|B - Z\|_F^2 + \beta \|P\|_F^2 + \gamma \|YW - B\|_F^2 + \mu \|W\|_F^2$$

$$\text{s.t. } B \in \{-1, +1\}^{n \times k}, Z^T 1_n = 0_k, Z^T Z = n \cdot E_k$$

where n denotes a sample size, k denotes a length of a Hash code, S denotes a similarity matrix, B denotes a Hash code, Z denotes an auxiliary variable, $\alpha$, $\beta$, $\lambda$ and $\gamma$ denote positive parameters, W denotes a transfer matrix between an image and a Hash code, and P denotes a transfer matrix between an image and nonlinear Hashing; and Y denotes an image category label, $E_k$ denotes a unit matrix, $\|\cdot\|_F$ denotes an f norm, $\varphi(\ )$ denotes nonlinear mapping, and X denotes an image training set.

As an alternative implementation, equilibrium and decorrelation constraints of a Hash code include:

the equilibrium constraint indicates that the number of Hash codes with a value of +1 is equal to the number of Hash codes with a value of −1, which is expressed as:

$$B^T 1_n = 0_k$$

the decorrelation constraint indicates that Hash codes of various bits are uncorrelated, which is expressed as:

$$B^T B = n \cdot E_k$$

where n denotes a sample size, k denotes a length of a Hash code, B denotes a Hash code, and $E_k$ denotes a unit matrix; and the asymmetric similarity matrix denotes that a similarity weight produced when image pairs are similar is not equal to a similarity weight produced when image pairs are dissimilar.

As an alternative implementation, after the model objective function is obtained, the method further includes optimizing the model objective function by updating an individual optimization variable while keeping other optimization variables constant, that is, alternating minimization solving and iterating until convergence.

As an alternative implementation, when an image is in the scenario of zero samples, Hash codes of the model objective function are optimized by adopting equilibrium strategies of standard normalization, average normalization and max-min normalization.

In a second aspect, the present disclosure provides a multiple scenario-oriented item retrieval system, including:

an image preprocessing module configured to extract, by Hashing learning, image features from an obtained image training set, and train a pre-built item retrieval model;

a first scenario-based training module configured to, when an image is in a scenario of hard samples, introduce an adaptively optimized similarity matrix into Hashing learning, optimize the similarity matrix by an image transfer matrix, and construct an adaptive similarity matrix objective function with the optimized similarity matrix and an image category label; construct a quantization loss objective function between the image and a Hash code according to the image transfer matrix; and conduct nonlinear Hashing mapping on the adaptive similarity matrix objective function and the quantization loss objective function to obtain a model objective function;

a second scenario-based training module configured to, when the image is in a scenario of zero samples, introduce into Hashing learning an asymmetric similarity matrix configured to constrain the generation of Hash codes, construct an objective function by taking an image category label as supervisory information in combination with equilibrium and decorrelation constraints of a Hash code, and conduct nonlinear Hashing mapping on the objective function to obtain a model objective function; and a retrieval module configured to train the item retrieval model based on the model objective function, and obtain a retrieved result of a to-be-retrieved target item image based on the trained item retrieval model.

Compared with the prior art, the present disclosure has the following beneficial effects.

The multiple scenario-oriented item retrieval method and system achieve item retrieval in multiple scenarios such as a scenario of hard samples, and a scenario of zero samples. By adoption of artificial intelligence technology, the item retrieval of image samples in multiple scenarios collected by the robot vision platform is realized.

According to the multiple scenario-oriented item retrieval method and system, in a scenario of hard samples, image features are extracted by Hashing learning based on a convolutional neural network (CNN), and an adaptive similarity matrix is introduced. In this way, a predefined fixed similarity matrix is avoided, easily-confused entities are distinguished, and a more accurate image similarity relationship is obtained, so as to better resolve the problem of item retrieval in the scenario of hard samples.

According to the multiple scenario-oriented item retrieval method and system, in a scenario of zero samples, image features are extracted by Hashing learning based on a convolutional neural network (CNN). Besides, instead of special supervisory information, only the easily-accessible category label information is adopted; and the asymmetric similarity matrix is introduced to better resolve the problem of item retrieval in the scenario of zero samples.

BRIEF DESCRIPTION OF THE DRAWINGS

The accompanying drawings which constitute a part of the description of the present disclosure are intended to provide further understanding of the present disclosure. The exemplary examples of the present disclosure and descriptions thereof are intended to explain the present disclosure and do not constitute an inappropriate limitation to the present disclosure. In the drawings:

FIG. 2 is a diagram illustrating results of verification on item retrieval in a scenario of hard samples according to Embodiment 1 of the present disclosure;

FIG. 3 is a diagram illustrating results of verification I on item retrieval in a scenario of zero samples according to Embodiment 1 of the present disclosure;

FIG. 4 is a diagram illustrating results of verification II on item retrieval in a scenario of zero samples according to Embodiment 1 of the present disclosure; and FIG. 5 is a diagram illustrating results of experimental verification on a linear Hashing method for using an equilibrium strategy in an AWA2 dataset according to Embodiment 1 of the present disclosure.

DETAILED DESCRIPTION OF THE EMBODIMENTS

Figure 1:
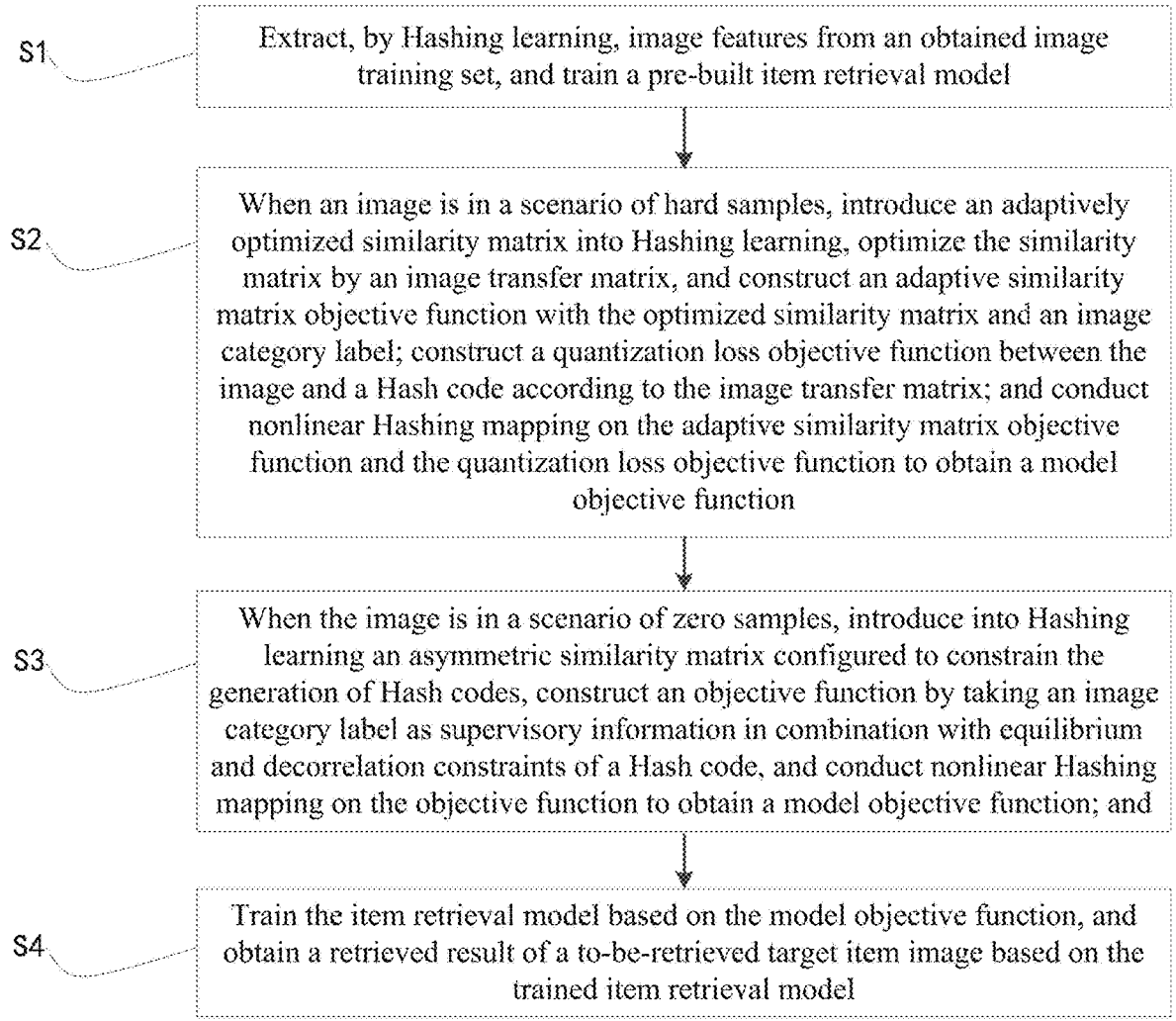
FIG. 1 is a flowchart of a multiple scenario-oriented item retrieval method according to Embodiment 1 of the present disclosure.

The present disclosure will be described in more detail with reference to the accompanying drawings and embodiments.

It should be pointed out that the following detailed description is illustrative and is intended to provide further explanation of the present disclosure. Unless otherwise specified, all technical and scientific terms used herein have the same meanings as those generally understood by those of ordinary skill in the art to which the present disclosure pertains.

It should be noted that the terms used herein are merely used for describing the specific implementations, but are not intended to limit exemplary implementations of the present disclosure. As used herein, unless the context clearly indicates otherwise, the singular forms are intended to include the plural forms as well. Moreover, it should be understood that the terms "include", "have" and any other variants mean to cover a non-exclusive inclusion, for example, a process, method, system, product, or device that includes a list of steps or units is not necessarily limited to those expressly listed steps or units, but may include other steps or units not expressly listed or inherent to such a process, method, system, product, or device.

In addition, the embodiments in the present disclosure and the features in the embodiments can be combined with each other in a non-conflicting situation.

Embodiment 1

As shown in FIG. 1, this embodiment provides a multiple scenario-oriented item retrieval method, including:

S1: extracting, by Hashing learning, image features from an obtained image training set, and training a pre-built item retrieval model;

S2: when an image is in a scenario of hard samples, introducing an adaptively optimized similarity matrix into Hashing learning, optimizing the similarity matrix by an image transfer matrix, and constructing an adaptive similarity matrix objective function with the optimized similarity matrix and an image category label; constructing a quantization loss objective function between the image and a Hash code according to the image transfer matrix; and conducting nonlinear Hashing mapping on the adaptive similarity matrix objective function and the quantization loss objective function to obtain a model objective function;

S3: when the image is in a scenario of zero samples, introducing into Hashing learning an asymmetric similarity matrix configured to constrain the generation of Hash codes, constructing an objective function by taking an image category label as supervisory information in combination with equilibrium and decorrelation constraints of a Hash code, and conducting nonlinear Hashing mapping on the objective function to obtain a model objective function; and S4: training the item retrieval model based on the model objective function, and obtaining a retrieved result of a to-be-retrieved target item image based on the trained item retrieval model.

According to this embodiment, image data are derived from the images of items collected by the robot vision platform in the real world, such as images of digital equipment, deep-sea fish, land wildlife, landmark buildings, etc.; then the images are preprocessed, including background removal with weak supervision, random erasure, standardization, and random rotation. Conventional preprocessing methods may be adopted as the preprocessing technology in this embodiment, which is not limited herein.

According to this embodiment, an item retrieval model is constructed based on a convolutional neural network to conduct feature extraction on preprocessed images. Image feature $x_i \in R^d$ is obtained from image $I_i$ using a convolutional neural network, where d denotes a dimension of the image feature $x_i$.

The backbone network used in this embodiment is CNN-F, a relatively mature multi-tasking learning framework is used as the basic model, and the CNN-F convolutional neural network is used as the feature extractor.

In step S2, when an image is in a scenario of hard samples, artificial intelligence technology is adopted to process image samples in the complex scenario collected by the robot vision platform. Based on the convolutional neural network, image features are extracted using the Hashing method, and the adaptive similarity matrix is introduced to better deal with the item retrieval in the a scenario of hard samples. The objective loss function is designed using supervised Hashing learning, during which similarity matrix learning is introduced; and the objective function is expanded to nonlinear Hashing through a kernel function.

According to this embodiment, category label $y_i$ of image $I_i$ is used during training. The category label is a single hot spot label, which can be obtained directly in all supervised data sets, mainly indicating that an image belongs to a certain category; and secondly, a Hash code of image $I_i$ is defined as $b_i$ by using Hashing method; and an image training set used in training is expressed as:

$$X=\{x_i\}_{i=1}^n \in R^{d\times n}$$

a label of the image training set is expressed as:

$$Y=\{y_i\}_{i=1}^n \in \{0,1\}^{c\times n}$$

the Hash code is expressed as:

$$B=\{b_i\}_{i=1}^n \in \{+1,-1\}^{k\times n}$$

where d denotes a dimension of an image feature $x_i$, c denotes a number of image categories, k denotes a length of a Hash code, and n denotes a sample size, namely a number of Hash codes;

a similarity matrix is defined as:

$$S=\{s_{ij}\}_{i,j=1}^n$$

where $s_{ij}$ denotes a similarity weight of image $x_i$ and image $x_j$.

Different from the existing item retrieval method in which a similarity matrix with fixed values is predetermined, this embodiment achieves optimization on an adaptive similarity matrix in the process of Hashing learning, such that the adaptive similarity matrix can describe different similarities of samples, which is beneficial to Hashing learning and maintaining the consistency of the image data. Accordingly, in this embodiment, the similarity matrix is optimized by using the data consistency between different samples, and the adaptive similarity matrix is constrained as follows:

$$\min_{W,S} \sum_{i,j} \|W^T x_i - W^T x_j\|_2^2 s_{ij}$$

$$\text{s.t. } \forall i, s_i^T 1_n = 1, 0 \le s_{ij} \le 1,$$

where $1_n$ denotes an all-ones vector of $n\times 1$, $s_{ij}$ denotes an element of a similarity matrix S, with a value being a similarity weight of image $x_i$ and image $x_j$, $s_i \in R^{n\times 1}$ denotes an ith row vector of the matrix S, and $W \in R^{d\times k}$ denotes a transfer matrix.

Based on the above constraint condition, the similarity of two data points with larger differences can be reduced, and the similarity of two data points with smaller differences can be increased. $\forall i, s_i^T 1_n = 1, 0 \le s_{ij} \le 1$ is set to prevent $s_{ij}$ from being equal to 0.

The adaptive similarity matrix in the above formula is different from a predefined similarity matrix. The similarity matrix is optimized in the process of Hashing learning, so that the obtained adaptive similarity matrix can better reflect the real similarity relationship than the predefined similarity matrix. However, there is a trivial solution to the above problem, that is, for $x_i$, only the most similar data points have a similarity of 1, while the rest have a similarity of 0. In order to avoid the above trivial solution, a case in which no similar information is involved in data is included in this embodiment to resolve the problem:

$$\min_{W,S} \sum_{i,j} (\|W^T x_i - W^T x_j\|_2^2 s_{ij} + \alpha s_{ij}^2)$$

$$\text{s.t. } \forall i, s_i^T 1_n = 1, 0 \le s_{ij} \le 1,$$

where α denotes a positive parameter.

In order to maintain the consistency between a feature space and a label space, and correctly extract label correlation from the label space, the following expression formula of the label information is added to the objective function:

$$\min_{W,S} \sum_{i,j} (\|W^T x_i - W^T x_j\|_2^2 s_{ij} + \alpha s_{ij}^2) + \beta \sum_{i,j} \|y_i - y_j\|_2^2 s_{ij}$$

$$\text{s.t. } \forall i, s_i^T 1_n = 1, 0 \le s_{ij} \le 1,$$

where β denotes a positive parameter; and $$\sum_{i,j} \|y_i - y_j\|_2^2 s_{ij}$$

is intended to maintain consistency between a feature space and a label space. However, a similarity matrix in Hashing method usually has a fixed value generated by a label, and therefore, this constraint condition is unnecessary. Moreover, a similarity matrix in this embodiment has adaptivity, which can be updated in same iterations; and therefore, supervised Hashing method is adopted in this embodiment.

In addition, regarding Hashing method, this embodiment establishes a relationship between original image data and a Hash code through a transfer matrix, which is sufficient to reduce the quantization loss between them; where the transfer matrix is configured to convert the original data into the Hash code.

To achieve these objectives, the following pattern is proposed:

$$\min_{W,B} \|W^T X - B\|_F^2$$
$$\text{s.t. } B \in \{-1, +1\}^{k \times n}.$$

In previous study, a nonlinear Hashing function usually has a much better generalization performance than that of a common Hashing function, as the former can adapt to more complex patterns. Therefore, in this embodiment, the objective function is expanded to nonlinear Hashing through a kernel function:

$$\omega(X) = [\varphi(x_1), \varphi(x_2), \ldots, \varphi(x_n)]^T,$$

where $\varphi: x \in \mathbb{R}^d \to \varphi(x) \in \mathbb{R}^{d'}$ denotes nonlinear mapping, and d' denotes a dimension after mapping.

Therefore, the above objective function can be expanded to:

$$\min_{P,B} \|P^T \varphi(X) - B\|_F^2$$
$$\text{s.t. } B \in \{-1, +1\}^{k \times n},$$

where $P \in \mathbb{R}^{d' \times k}$ denotes a transfer matrix of nonlinear Hashing.

In order to avoid the maximum or minimum value in the transfer matrix and make the transfer matrix smoother, this embodiment adds regular terms and a parameter coordination loss function, which is expressed as follows:

$$\min_{P,B} \lambda \|P^T \varphi(X) - B\|_F^2 + \gamma \|P\|_F^2$$
$$\text{s.t. } B \in \{-1, +1\}^{k \times n},$$

where $\lambda$ and $\gamma$ denote positive parameters.

Similarly, the objective function using the adaptive similarity matrix is expanded to nonlinear Hashing, which is expressed as:

$$\min_{P,S} \sum_{i,j} \left( \|P^T \varphi(x_i) - P^T \varphi(x_j)\|_2^2 s_{ij} + \alpha s_{ij}^2 \right) + \beta \sum_{i,j} \|y_i - y_j\|_2^2 s_{ij}$$
$$\text{s.t. } \forall i, s_i^T 1_n = 1, 0 \leq s_{ij} \leq 1,$$

Finally, based on the above factors, the final objective loss function is expressed as follows:

$$\min_{P,S,B} \sum_{i,j} \left( \|P^T \varphi(x_i) - P^T \varphi(x_j)\|_2^2 s_{ij} + \alpha s_{ij}^2 \right) +$$
$$\beta \sum_{i,j} \|y_i - y_j\|_2^2 s_{ij} + \lambda \|P^T \varphi(X) - B\|_F^2 + \gamma \|P\|_F^2$$
$$\text{s.t. } \forall i, s_i^T 1_n = 1, 0 \leq s_{ij} \leq 1, B \in \{-1, +1\}^{k \times n}.$$

In this embodiment, the above loss function is optimized, which covers three optimization variables of B, P and S; the optimization procedure includes updating an individual variable while keeping other two variables constant (i.e., alternating minimization), and iterating the process until convergence. Specific steps are as follows:

(1) Optimize P, fix all variables except P, and obtain the optimization objective of P as follows:

$$\min_P \sum_{i,j} \left( \|P^T \varphi(x_i) - P^T \varphi(x_j)\|_2^2 s_{ij} \right) + \lambda \|P^T \varphi(X) - B\|_F^2 + \gamma \|P\|_F^2$$

Convert the model to a matrix form as follows:

$$\min Tr\left(P^T \varphi(X) L \varphi(X)^T P\right) + \lambda \|P^T \varphi(X) - B\|_F^2 + \gamma \|P\|_F^2,$$

where L denotes a Laplacian matrix, L=D−S, D denotes a diagonal matrix, an ith diagonal element is calculated as $D_{ii} = \Sigma_{j=1}^n s_{ij}$, and at this moment, 0 is obtained by taking the derivative of P, which is expressed as:

$$P = \left( \varphi(X) \varphi(X)^T + \frac{\gamma}{\lambda} E + \frac{1}{\lambda} \varphi(X) L \varphi(X)^T \right)^{-1} \varphi(X) B;$$

where, E denotes a unit matrix.

(2) Optimize S, fix all variables except S, and obtain the optimization objective of S as follows:

$$\min_S \sum_{i,j} \left( \|P^T \varphi(x_i) - P^T \varphi(x_j)\|_2^2 s_{ij} + \alpha s_{ij}^2 \right) + \beta \sum_{i,j} \|y_i - y_j\|_2^2 s_{ij}$$
$$\text{s.t. } \forall i, s_i^T 1_n = 1, 0 \leq s_{ij} \leq 1;$$

For simplicity of the matrix, the following definition is given:

$$M \in \mathbb{R}^{n \times n}, m_{ij} = -\frac{1}{2\alpha} \left( \|P^T \varphi(x_i) - P^T \varphi(x_j)\|_2^2 + \beta \|y_i - y_j\|_2^2 \right);$$

Then the above problems may be converted to the following:

$$\min_S \sum_{i,j} \|s_i - m_i\|_2^2$$
$$\text{s.t. } \forall i, s_i^T 1_n = 1, 0 \leq s_{ij} \leq 1;$$

In this embodiment, existing algorithms are used to solve the above problems. In the above formula, $\alpha$ is used to balance uniform distribution in the trivial solution and the total loss function. Assuming that a neighbor is defined for each instance, optimal α is as follows:

$$\alpha = \frac{1}{n}\sum_{i=1}^{n}(\frac{e}{2}h_{i,e+1} - \frac{1}{2}\sum_{j=1}^{k}h_{ij}),$$

where matrices $H \in R^{n \times n}$, $h_{ij} = \|P^T\varphi(x_i) - P^T\varphi(x_j)\|_2^2 + \beta\|y_i - y_j\|_2^2$, $h_{i1}, h_{i2}, \ldots, h_{i,e+1}$ are arranged in an ascending order.

(3) Optimize B, fix all variables except B, and obtain the optimization objective of B as follows:

$$\min_{B} \lambda \|P^T\varphi(X) - B\|_F^2$$

$$\text{s.t. } B \in \{-1, +1\}^{k \times n},$$

Therefore, the optimal solution of the above formula is as follows:

$$B = \text{sgn}(P^T\varphi(X)).$$

In this embodiment, the above item retrieval method in the scenario of hard samples is verified, and the experimental data are obtained from three data sets of CIFAR-10, NUS-WIDE and MS-COCO. The verification result is shown in FIG. 2, and SASH is adopted in the embodiment. According to this embodiment, mAP (accuracy rate) is used as the evaluation index. As can be seen, the accuracy of this embodiment is higher than that of other methods, and this embodiment has superior performance, especially on the two multi-label data sets of NUS-WIDE and MS-COCO.

In the meanwhile, the above method can be adopted to achieve item retrieval in a scenario of zero samples, and experimental data are obtained from three data sets of AWA2, CUB and CIFAR-10, where AWA2 and CUB are common zero-sample Hash data sets, with numbers of visible categories and invisible categories being 40/10 and 150/50, respectively; regarding the CIFAR-10 data set, 8 categories are taken as visible categories, and the other two categories are taken as invisible categories, and SASH is the method adopted in this embodiment. As can be seen from verification results shown in FIG. 3, excellent performance is also exhibited in zero-sample data sets.

According to this embodiment, in step S3, when images are in a scenario of zero samples, image features are generated by using Hashing method. Instead of special supervisory information, the asymmetric similarity matrix is used, and three equilibrium strategies are proposed. Meanwhile, the model has an intuitive structure, and is easy to transfer and deploy, which makes it easier to achieve item retrieval in a scenario of zero samples.

According to this embodiment, "equilibrium" and "decorrelation" constraints of Hash codes are added during the design of a loss function without introducing special supervisory information (only category labels are used), and the objective function is expanded to nonlinear Hashing through a kernel function.

The image training set, labels, Hash codes and similarity matrix in the scenario of zero samples are all consistent with those in the scenario of hard samples, and details are not described herein.

According to this embodiment, in order to obtain Hash codes and satisfy the retrieval performance while retaining more information, equilibrium and decorrelation constraints of a Hash code are added to the loss function in form of an inner product, which is expressed as:

$$\min_{B} \|k \cdot S - BB^T\|_F^2$$

$$\text{s.t. } B \in \{-1, +1\}^{n \times k}, B^T 1_n = 0_k, B^T B = n \cdot E_k,$$

where $1_n$ denotes an all-ones vector of n×1, $0_k$ denotes an all-zeroes vector of k×1, $E_k$ denotes a unit matrix of k×k, and $\|\cdot\|_F$ denotes an f norm;

where the equilibrium constraint indicates that the number of Hash codes with a value of +1 should be close to or equal to the number Hash codes with a value of −1 as much as possible, which is expressed as:

$B^T 1_n = 0_k$ the decorrelation constraint indicates that Hash codes of various bits should be uncorrelated, which is expressed as:

$B^T B = n \cdot E_k$.

It should be noted that the similarity matrix S in the above objective function is an asymmetric similarity matrix, which denotes that a similarity weight produced when image pairs are similar is not equal to a similarity weight produced when image pairs are dissimilar.

The ultimate purpose of this embodiment is to learn a group of Hashing function from visible training data under supervision, so as to create high-quality binary codes for invisible data. In addition, this embodiment only uses category labels as supervisory information, instead of using special supervisory information. To achieve the above objectives, the following pattern is proposed:

$$\min_{B,P,W} \|k \cdot S - BB^T\|_F^2 + \lambda\|XP - B\|_F^2 + \beta\|P\|_F^2 + \gamma\|YW - B\|_F^2 + \mu\|W\|_F^2$$

$$\text{s.t. } B \in \{-1, +1\}^{n \times k}, B^T 1_n = 0_k, B^T B = n \cdot E_k,$$

where λ denotes a positive parameter and a weight coefficient of quantization loss, which are configured to measure the relative importance of binary codes and Hashing functions; γ denotes a positive parameter configured to measure the relative importance of the relationship between binary codes and category labels; β and μ denote hyperparameters, and $P \in P^{d \times k}$ and $W \in R^{c \times k}$ each denote a transfer matrix, both of them used for tuning the performance of the model.

In the above loss function, $\|k \cdot S - BB^T\|_F^2$ guides a Hash code using loss items in a form of an inner product, $\lambda\|XP - B\|_F^2$ is intended to learn a relationship between image features and a Hash code by matrix transfer, $\beta\|P\|_F^2$ is configured to constrain the transfer matrix from having an excessively big or small value, $\gamma\|YW - B\|_F^2$ has a built-in relationship between label information and a Hash code, and $\mu\|W\|_F^2$ denotes a regular term for constraining W.

In this embodiment, an auxiliary variable $Z \in R^{n \times k}$ is introduced to approximate a real value of a discrete variable B, thus making the optimization objective easier to solve. Therefore, the overall objective function of the above factors can be expanded to:

$$\min_{B,P,W,Z} \|k \cdot S - BZ^T\|_F^2 + \lambda\|XP - B\|_F^2 +$$

-continued $$\alpha\|B-Z\|_F^2 + \beta\|P\|_F^2 + \gamma\|YW-B\|_F^2 + \mu\|W\|_F^2$$

s.t. $B \in \{-1, +1\}^{n \times k}$, $Z^T 1_n = 0_k$, $Z^T Z = n \cdot E_k$.

In previous study, a nonlinear Hashing function usually has a much better generalization performance than that of a common Hashing function, as the former can adapt to more complex patterns. Therefore, in this embodiment, the objective function is expanded to nonlinear Hashing through a kernel function:

$$\varphi(X) = [\varphi(x_1), \varphi(x_2), \ldots, \varphi(x_n)]^T,$$

where $\varphi: x \in R^d \to \varphi(x) \in R^{d'}$ denotes nonlinear mapping, and d' denotes a dimension after mapping.

Therefore, the overall objective function can be expanded to:

$$\min_{B,P,W,Z} \|k \cdot S - BZ^T\|_F^2 + \lambda\|\varphi(X)P - B\|_F^2 +$$

$$\alpha\|B-Z\|_F^2 + \beta\|P\|_F^2 + \gamma\|YW-B\|_F^2 + \mu\|W\|_F^2$$

s.t. $B \in \{-1, +1\}^{n \times k}$, $Z^T 1_n = 0_k$, $Z^T Z = n \cdot E_k$

In this embodiment, the above loss function is optimized, which covers four optimization variables of B, P, W and Z; the optimization procedure includes updating an individual variable while keeping other three variables constant (i.e., alternating minimization), and iterating the process until convergence.

(1) Optimize P, fix all variables except P, and obtain the optimization objective of P as follows:

$$\min_P \lambda\|\varphi(X)P - B\|_F^2 + \beta\|P\|_F^2$$

0 is obtained by taking the derivative of P, which is expressed as:

$$P = \left(\varphi(X)^T \varphi(X) + \frac{\beta}{\lambda}E\right)^{-1} \varphi(X)^T B.$$

(2) Optimize W, fix all variables except W, and obtain the optimization objective of W as follows:

$$\min_W \gamma\|YW - B\|_F^2 + \mu\|W\|_F^2$$

0 is obtained by taking the derivative of W, which is expressed as:

$$W = \left(Y^T Y + \frac{\mu}{\gamma}E\right)^{-1} Y^T B.$$

(3) Optimize B, fix all variables except B, and obtain the optimization objective of B as follows:

$$\min_B \|k \cdot S - BZ^T\|_F^2 + \lambda\|\varphi(X)P - B\|_F^2 + \alpha\|B-Z\|_F^2 \gamma\|YW-B\|_F^2$$

s.t. $B \in \{-1, +1\}^{n \times k}$;

This equation is equivalent to the optimization problem:

$$\max_B Tr\left(B^T \{k \cdot SZ + \lambda\varphi(X)P + \alpha Z + \gamma YW\}\right)$$

s.t. $B \in \{-1, +1\}^{n \times kK}$;

where Tr(•) denotes a trace of a matrix.

Therefore, the optimal solution of the above formula is as follows:

$$B^T = \text{sgn}(k \cdot SZ + \lambda\varphi(X)P + \varphi Z + \gamma YW)$$

(4) Optimize Z, fix all variables except Z, and obtain the optimization objective of Z as follows:

$$\min_Z \|k \cdot S - BZ^T\|_F^2 + \alpha\|B-Z\|_F^2$$

s.t. $Z^T 1_n = 0_k$, $Z^T Z = n \cdot E_k$

The equation is further simplified as:

$$\max_Z Tr(Z^T L)$$

s.t. $Z^T 1_n = 0_k$, $Z^T Z = n \cdot E_k$ where $L = k \cdot SB + \alpha B$

At this moment, a closed solution is as follows:

$$Z = \sqrt{n}[U, \overline{U}][V, \overline{V}]^T$$

where U and V can be obtained by conducting singular value decomposition on JL:

$$J = E_n - \frac{1}{n} 1_n 1_n^T; JL = U\sum V = \sum_{k=1}^{K'} \sigma_k u_k V_k^T$$

Finally, $\overline{U}$, $\overline{V}$ is obtained through Gram Schmidt processing.

During the optimization process, there always exists some items having varying orders of magnitudes. For example, in the process of optimizing Hash code B, optimization subitems have different orders of magnitudes, and in the final optimized Hash codes using a symbol function, only symbols of subitems with the maximum order of magnitude are obtained. Therefore, some subitems are invalid to optimization. In view of this, three equilibrium strategies are designed in this embodiment to resolve the above problem, so that information of all of the subitems are made full use of in the optimization process. The following is particularly expressed as follows:

Standard normalization:

$$std(A) = \frac{A - \text{MEAN}(A)}{\delta}$$

Average normalization:

$$ave(A) = \frac{A - \text{MEAN}(A)}{\max(A) - \min(A)}$$

Max-min normalization:

$$\min\max(A) = \frac{A - \text{MIN}(A)}{\max(A) - \min(A)}$$

where A denotes a certain subitem, δ denotes a standard deviation, max(•) denotes a maximum function, min(•) denotes a minimum function, and output results are real values; and MEAN ( ) is a mean function, MIN ( ) is minimum function, and the output result is a real-valued matrix. Based on the equilibrium strategy, the problem that subitems vary in number is solved while making full use of the information of each subitem.

In this embodiment, as shown in FIG. 4, in a scenario of zero samples, verification results of the above item retrieval method are adopted, and experimental data are obtained from three data sets of AWA2, CUB and CIFAR-10, where AWA2 and CUB are common zero-sample Hash data sets, with numbers of visible categories and invisible categories being 40/10 and 150/50, respectively; regarding the CIFAR-10 data set, 8 categories are taken as visible categories, and the other two categories are taken as invisible categories. ASZH is adopted in this embodiment, evaluation index of which is mAP (accuracy rate). As can be seen, the accuracy rate in this embodiment is higher compared with other methods.

FIG. 5 shows an experiment on a linear Hashing method using an equilibrium strategy in an AWA2 data set, where std, ave and minmax respectively indicate the use of a standardization strategy, an average normalization strategy and a max-min normalization strategy, while without indicates that equilibrium strategy is not used. As can be seen, if subitems have no difference in the order of magnitudes, the balancing strategy will not work; on the contrary, if there exists a difference in the order of magnitudes, the balancing strategy can influence Hash codes use the information of each subitem.

Embodiment 2

This embodiment provides a multiple scenario-oriented item retrieval system, including:
an image preprocessing module configured to extract, by Hashing learning, image features from an obtained image training set, and train a pre-built item retrieval model;
a first scenario-based training module configured to, when an image is in a scenario of hard samples, introduce an adaptively optimized similarity matrix into Hashing learning, optimize the similarity matrix by an image transfer matrix, and construct an adaptive similarity matrix objective function with the optimized similarity matrix and an image category label; construct a quantization loss objective function between the image and a Hash code according to the image transfer matrix; and conduct nonlinear Hashing mapping on the adaptive similarity matrix objective function and the quantization loss objective function to obtain a model objective function;
a second scenario-based training module configured to, when the image is in a scenario of zero samples, introduce into Hashing learning an asymmetric similarity matrix configured to constrain the generation of Hash codes, construct an objective function by taking an image category label as supervisory information in combination with equilibrium and decorrelation constraints of a Hash code, and conduct nonlinear Hashing mapping on the objective function to obtain a model objective function; and
a retrieval module configured to train the item retrieval model based on the model objective function, and obtain a retrieved result of a to-be-retrieved target item image based on the trained item retrieval model.

It should be noted herein that the foregoing modules correspond to the steps in Embodiment 1, and examples and application scenarios implemented by the foregoing modules are the same as those implemented by the corresponding steps, but are not limited to the content disclosed in Embodiment 1. It should be noted that, as part of the system, the above-mentioned modules can be executed in a computer system such as a set of computer-executable instructions.

The above describes the specific implementations of the present disclosure, but is not intended to limit the protection scope of the present disclosure. Those skilled in the art should understand that any modifications or variations made by those skilled in the art without creative efforts still fall within the protection scope of the present disclosure based on the technical solutions of the present disclosure.

What is claimed is:

1. A multiple scenario-oriented item retrieval method, comprising:
    extracting, by Hashing learning, image features from an obtained image training set, and training a pre-built item retrieval model;
    when an image is in a scenario of hard samples, introducing an adaptively optimized similarity matrix into Hashing learning, optimizing the similarity matrix by an image transfer matrix, and constructing an adaptive similarity matrix objective function with the optimized similarity matrix and an image category label; constructing a quantization loss objective function between the image and a Hash code according to the image transfer matrix; and conducting nonlinear Hashing mapping on the adaptive similarity matrix objective function and the quantization loss objective function to obtain a model objective function;
    when the image is in a scenario of zero samples, introducing into Hashing learning an asymmetric similarity matrix configured to constrain the generation of Hash codes, constructing an objective function by taking an image category label as supervisory information in combination with equilibrium and decorrelation constraints of a Hash code, and conducting nonlinear Hashing mapping on the objective function to obtain a model objective function; and
    training the item retrieval model based on the model objective function, and obtaining a retrieved result of a to-be-retrieved target item image based on the trained item retrieval model.

2. The multiple scenario-oriented item retrieval method according to claim 1, wherein the adaptive similarity matrix objective function is as follows:

$$\min_{W,S} \sum_{i,j} \left( \|W^T x_i - W^T x_j\|_2^2 s_{ij} + \alpha s_{ij}^2 \right) + \beta \sum_{i,j} \|y_i - y_j\|_2^2 s_{ij},$$

-continued s.t. $\forall i, s_i^T 1_n = 1, 0 \le s_{ij} \le 1,$ wherein $1_n$ denotes an all-ones vector of n×1, and n denotes a sample size; $s_{ij}$ denotes an element of a similarity matrix S, with a value being a similarity weight of image $x_i$ and image $x_j$, and $s_i$ denotes an ith row vector of the matrix S; W denotes a transfer matrix; $y_i$ and $y_j$ denote category labels; and $\alpha$ and $\beta$ denote positive parameters.

3. The multiple scenario-oriented item retrieval method according to claim 1, wherein the quantization loss objective function is as follows:

$$\min_{W,B} \lambda \|W^T X - B\|_F^2 + \gamma \|P\|_F^2$$

s.t. $B \in \{-1, +1\}^{k \times n}$ wherein W denotes a transfer matrix between an image and a Hash code, P denotes a transfer matrix between an image and nonlinear Hashing, X denotes an image training set, B denotes a Hash code, $\lambda$ and $\gamma$ denote positive parameters, k denotes a length of a Hash code, n denotes a sample size, and $\|\cdot\|_F$ denotes an f norm.

4. The multiple scenario-oriented item retrieval method according to claim 1, wherein said nonlinear Hashing mapping comprises expanding the objective function into nonlinear Hashing through a kernel function, which is expressed as:

$$\varphi(X) = [\varphi(x_1), \varphi(x_2), \ldots, \varphi(x_n)^T]$$

wherein $\varphi: x \in R^d \to \varphi((x) \in R^{d'}$ denotes nonlinear mapping, d denotes a feature dimension of image $x_n$, d' denotes a dimension after mapping, X denotes an image training set, and n denotes a sample size.

5. The multiple scenario-oriented item retrieval method according to claim 1, wherein the model objective function in the scenario of hard samples is as follows:

$$\min_{P,S,B} \sum_{ij} (\|P^T \varphi(x_i) - P^T \varphi(x_j)\|_2^2 s_{ij} + \alpha s_{ij}^2) +$$

$$\beta \sum_{i,j} \|y_i - y_j\|_2^2 s_{ij} + \lambda \|P^T \varphi(X) - B\|_F^2 + \gamma \|P\|_F^2$$

s.t. $\forall i, s_i^T 1_n = 1, 0 \le s_{ij} \le 1, B \in \{-1, +1\}^{k \times n}$ wherein n denotes a sample size, W denotes a transfer matrix between an image and a Hash code, and P denotes a transfer matrix between an image and nonlinear Hashing; X denotes an image training set, B denotes a Hash code, $1_n$ denotes an all-ones vector of n×1, $s_{ij}$ denotes an element of a similarity matrix S, with a value being a similarity weight of image $x_i$ and image $x_j$, and $s_i$ denotes an ith row vector of the matrix S; $\varphi(\ )$ denotes nonlinear mapping; $y_i$ and $y_j$ denote category labels; and $\alpha$, $\beta$, $\lambda$ and $\gamma$ denote positive parameters, and k denotes a length of a Hash code.

6. The multiple scenario-oriented item retrieval method according to claim 1, wherein the model objective function in the scenario of zero samples is as follows:

$$\min_{B,P,W,Z} \|k \cdot S - BZ^T\|_F^2 + \lambda \|\varphi(X)P - B\|_F^2 +$$

$$\alpha \|B - Z\|_F^2 + \beta \|P\|_F^2 + \gamma \|YW - B\|_F^2 + \mu \|W\|_F^2$$

s.t. $B \in \{-1, +1\}^{n \times k}, Z^T 1_n = 0_k, Z^T Z = n \cdot E_k$ wherein n denotes a sample size, k denotes a length of a Hash code, S denotes a similarity matrix, B denotes a Hash code, Z denotes an auxiliary variable, $\alpha$, $\beta$, $\lambda$ and $\gamma$ denote positive parameters, W denotes a transfer matrix between an image and a Hash code, and P denotes a transfer matrix between an image and nonlinear Hashing; and Y denotes an image category label, $E_k$ denotes a unit matrix, $\|\cdot\|_F$ denotes an f norm, $\varphi(\ )$ denotes nonlinear mapping, and X denotes an image training set.

7. The multiple scenario-oriented item retrieval method according to claim 1, wherein equilibrium and decorrelation constraints of a Hash code are as follows:

the equilibrium constraint indicates that the number of Hash codes with a value of +1 is equal to the number of Hash codes with a value of −1, which is expressed as:

$$B^T 1 = 0_k$$

the decorrelation constraint indicates that Hash codes of various bits are uncorrelated, which is expressed as:

$$B^T B = n \cdot E_k$$

wherein n denotes a sample size, k denotes a length of a Hash code, B denotes a Hash code, and $E_k$ denotes a unit matrix; and the asymmetric similarity matrix denotes that a similarity weight produced when image pairs are similar is not equal to a similarity weight produced when image pairs are dissimilar.

8. The multiple scenario-oriented item retrieval method according to claim 1, wherein after the model objective function is obtained, the method further comprises optimizing the model objective function by updating an individual optimization variable while keeping other optimization variables constant, that is, alternating minimization solving and iterating until convergence.

9. The multiple scenario-oriented item retrieval method according to claim 8, wherein when an image is in the scenario of zero samples, Hash codes of the model objective function are optimized by adopting equilibrium strategies of standard normalization, average normalization and max-min normalization.

10. A multiple scenario-oriented item retrieval system, comprising: a processor and a memory having computer instructions stored thereon, wherein, the processor is configured to execute the computer instructions to:

extract, by Hashing learning, image features from an obtained image training set, and train a pre-built item retrieval model;

when an image is in a scenario of hard samples, introduce an adaptively optimized similarity matrix into Hashing learning, optimize the similarity matrix by an image transfer matrix, and construct an adaptive similarity matrix objective function with the optimized similarity matrix and an image category label; construct a quantization loss objective function between the image and a Hash code according to the image transfer matrix; and conduct nonlinear Hashing mapping on the adaptive similarity matrix objective function and the quantization loss objective function to obtain a model objective function;

when the image is in a scenario of zero samples, introduce into Hashing learning an asymmetric similarity matrix configured to constrain the generation of Hash codes, construct an objective function by taking an image category label as supervisory information in combination with equilibrium and decorrelation constraints of a Hash code, and conduct nonlinear Hashing mapping on the objective function to obtain a model objective function; and train the item retrieval model based on the model objective function, and obtain a retrieved result of a to-be-retrieved target item image based on the trained item retrieval model.

\* \* \* \* \*